March 17, 1964 W. J. KENNEALLY 3,125,741
PERMANENT RECORDING ELECTRON RESPONSIVE CHEMICAL
DISPLAY PANEL CONTROLLED BY AN
ELECTROLUMINESCENT MATRIX
Filed Jan. 12, 1962
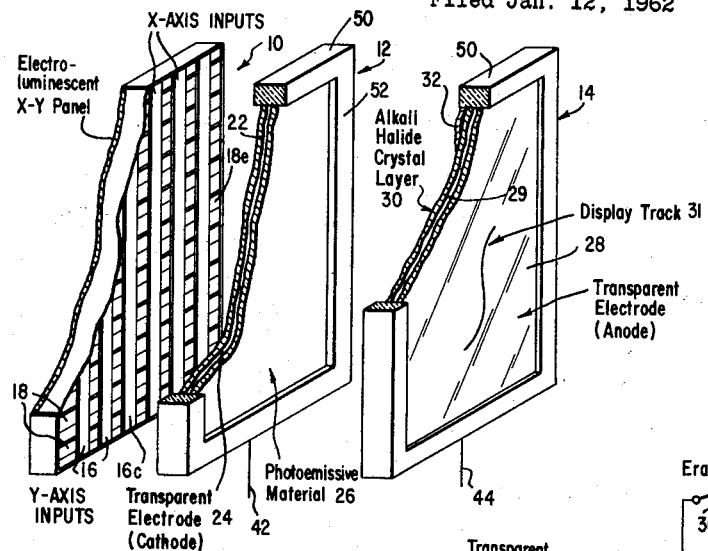
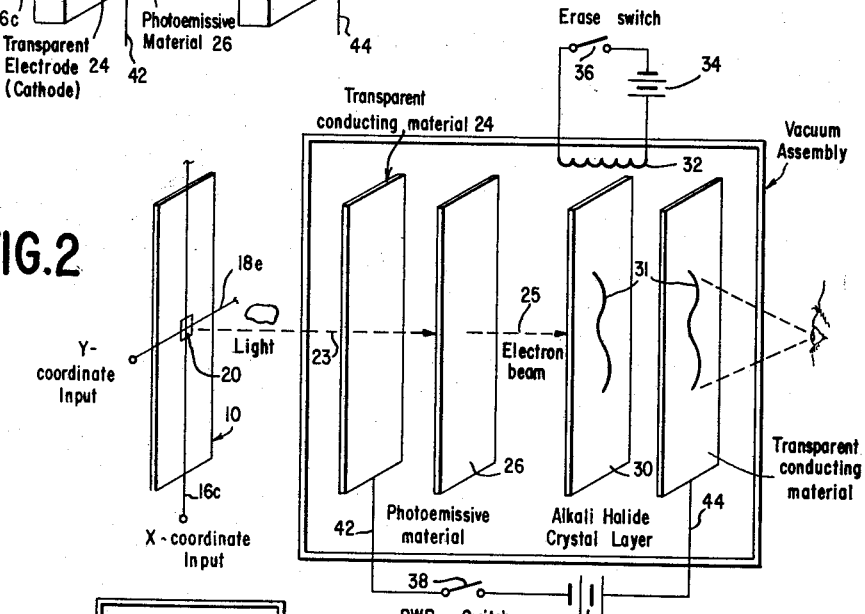
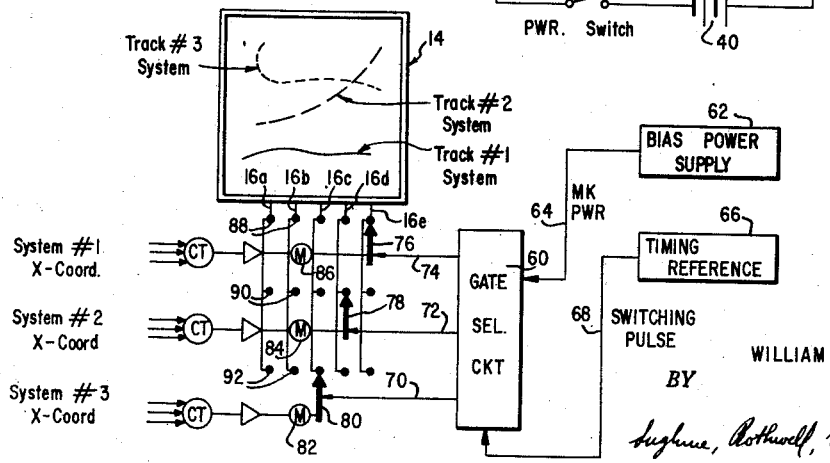
INVENTOR.
WILLIAM J. KENNEALLY
BY
ATTORNEYS displaying more than one geometric point of interest at any given time.

It is a further object of this invention to provide an apparatus of this type which is capable of displaying both geometric points and alphanumeric data.

It is a further object of this invention to provide an apparatus of this type in which the effect of ambient light is reduced for daylight viewing without the requirement for special hoods and the like.

It is a further object of this invention to provide an apparatus of this type in which the displayed data may be stored in permanent form, with respect to normal operational time without requiring an active power source.

It is a further object of this invention to provide an apparatus of this type which is static in construction and in which the need for moving parts is completely eliminated.

It is a further object of this invention to provide an apparatus of this type which is able to withstand severe environmental conditions encountered in tactical military operations.

It is a further object of this invention to provide an apparatus of this type which will operate on a minimum of power in the "write mode" and in which the stored display data may be easily erased.

Other objects and advantages of the invention will become apparent from the following detailed description taken in conjunction with the accompanying drawings, in which:

FIGURE 1 is a perspective, exploded view of the elements making up the solid state situation display apparatus of the present invention;

FIGURE 2 is a schematic, perspective view of the basic elements of the invention forming part of the apparatus of FIGURE 1;

FIGURE 3 is a schematic view of the electrical circuit associated with one set of the coordinates of the electroluminescent panel forming a portion of the display apparatus of this invention.

While the invention is susceptible to various modifications and alternative constructions, there is shown in the drawing a preferred embodiment of the invention. It is to be understood, however, that it is not intended to limit this invention by any such disclosure and the aim is to cover alternative constructions and uses falling within the spirit and scope of the invention as expressed in the appended claims.

Briefly, in the preferred embodiment, the solid state situation display apparatus comprises a selectively operable electroluminescent panel for creating an optical image. A photoemissive panel is positioned adjacent to the electroluminescent panel and acts to receive the optical image for transforming the optical image into electron form. A chemically responsive display member is affixed to the opposite face of the solid state display to receive the electron image for converting the electron image into a visible image, while allowing retention of the visible image for a substantial period of time after removal of the momentary optical image from the electroluminescent panel. In one form the display panel may be physically removed from the electroluminescent and data input portion of apparatus with the image intact, allowing the display panel to be stored for extensive periods of time. Erasure means are provided adjacent to the chemical display panel for removing the stored optical image as desired. Erasure may also be accomplished by means of an external high intensity light source. Suitable timing means are provided in the electrical input cycle for the electroluminescent panel matrix to allow simultaneous display of a plurality of tracers.

Referring to FIGURE 1, there is shown a mechanical conceptual design of the solid state situation display ap-

---

United States Patent Office 3,125,741
Patented Mar. 17, 1964

3,125,741
PERMANENT RECORDING ELECTRON RESPONSIVE CHEMICAL DISPLAY PANEL CONTROLLED BY AN ELECTROLUMINESCENT MATRIX
William J. Kenneally, Baltimore, Md., assignor to Martin-Marietta Corporation, Baltimore, Md., a corporation of Maryland
Filed Jan. 12, 1962, Ser. No. 165,893
14 Claims. (Cl. 340—24)

This invention relates to an apparatus for optically displaying chargeable data and more particularly to an apparatus of the solid state type in which the visual data image of the display apparatus is retained for a considerable time period after the image creating means have been removed.

The development of mobile, self-sufficient weapon systems for many areas of modern warfare has in turn generated rather stringent requirements for adequate communications. One area of the communication problem which is becoming increasingly troublesome is that of situation data display. At the present time, there are available many types of situation display equipment. Briefly, the various generic types fall within the following fundamental areas: cathode ray tubes, optical projectors, mechanical plotters and electroluminescent display panels. The cathode ray tubes or direct storage tubes provide one means of presenting several simultaneous displays by time sharing of the electron gun. However, the trace storage time is limited to about forty seconds for many of the current tubes. Since the trace is presented as a luminous display, daylight viewing is considerably limited. Size is a major problem of direct view storage tubes, with weight also being a serious limitation. In addition, the cost of such viewing devices prohibits universal use.

Optical projectors have colored tracers to provide a more graphic display, and within reasonable limits, optical projectors are not limited in number of simultaneous tracks that can be displayed. Size is a major problem of optical projectors in that effective optical distances must be provided. Even when "folded" optical paths are used the depth required is excessive. While accuracy is quite good, the price of such projection is generally prohibitive to their general use.

While mechanical plotters have been in general use over an extensive period of time, they are generally limited to only one variable for continuous plotting. In multiple plot devices, it is necessary that the information be switched from one pen to the other in the event of collision to allow simultaneous trace projection. Even where mechanical plotters of small size have been built, the necessary accuracy requires tight mechanical tolerences which increases the cost considerably.

The area of electroluminescence seems to offer the greatest number of advantages with the least number of disadvantages in the development of a suitable, multiple data display. Units of this type can display several traces simultaneously by suitable time sharing of the write panel. However, where an electroluminescent panel is used singly as both the write and display panel, the panel must be updated every few seconds to eliminate display loss. The only practical limitation to the size of the equipment desired is "spot spreading" which generates a diffused circle where a point should be displayed. Therefore, the display accuracy is essentially limited only by the resolution available in the basic electroluminescent panel. However, known electroluminescent panels which provide for data storage as well as immediate display are both complicated and expensive.

It is therefore an object of this invention to provide a solid state situation display apparatus employing an electroluminescent panel in which the apparatus is capable of paratus of the present invention. In general, the solid state device is a sandwich affair consisting of three main elements, an electroluminescent panel 10, an intermediate panel 12 including a coating of photoemissive material, and a display panel 14. The physical structure of the electroluminescent panel 10 is quite conventional and is used as the "writing element" of the apparatus. The term "electroluminescence" as used in this application covers the various effects that can occur when certain phosphors are subjected to an electrical field. The electroluminescence panel 10 of the present invention makes use of intrinsic electroluminescence, that is, the so-called "Destriau effect" which includes light emission by suitable phosphorous powders embedded in an insulator and subjected only to the action of an alternating electric field.

Basically, an electroluminescent panel consists of separated electrical conductors which may be positioned on each side of the film or layer of phosphor to form a cross-grid structure or matrix wherein a portion of the film defined as a cell is connected between one horizontal conductor and one vertical conductor. When a suitable electrical potential difference is applied between any pair of horizontal and vertical conductors, the cell connected between this pair will luminesce thus providing a segregated light ray. Data input signals of appropriate electrical form (duration, voltage, and frequency) are used to excite the writing element for electroluminescent panel 10. This may be accomplished by suitable energization of the X axis inputs indicated at 16 and the Y axis inputs 18. For instance, energization of Y axis input 18e and X axis input 16c would cause a spot of light to be produced at the intersection of these elements as indicated by numeral 20, FIGURE 2. The spot of light is produced at the coordinate intersection corresponding to the coordinate point (geographic) of the data to be displayed. The spot of light such as 20 is projected toward the panel 12 which is coated with photoemissive material. Panel 12 includes a transparent base 22 which may be glass. This element is given a cathode coating 24 and a photoemissive layer 26 is deposited on the cathode coating. The photoemissive layer 26 is called a "beam translator" because it converts the light input from the electroluminescent panel 10 into an equivalent electron beam. The photoemissive material is used in the solid state situation display as an intermediate mechanism or a beam translator to translate the optical input into a form suitable for storage in the basic display element. The term "photoemission" is used to describe the particular mechanism by which an electron can receive enough energy to penetrate the potential barrier at the surface of a solid.

The third element of the solid state situation display apparatus includes a transparent electrode which may be formed of glass in the same manner as the electrode 22 of the intermediate element 12 and acts as the anode for the system. This transparent electrode is provided with a suitable chemical coating on the face opposite that of the photoemissive material 26 formed on intermediate element 12. The chemical coating in the preferred embodiment comprises an alkali halide crystal layer. The display trace is developed by the action of the incident photoelectrons moving from the photoemissive layer 26 to the alkali halide crystal layer 30. A relatively high potential is required between the alkali halide crystal layer 30 and the photoemissive material layer 26 to effect electron movement and trace generation.

The particular phenomena which occur when the electrons strike the alkali halide crystal layer revolve about the concept of color centers. When crystals of these materials are bombarded with cathode rays, they darken, with each compound having its own characteristic color. For example, sodium chloride becomes yellow, and potassium chloride magenta.

Since there is definite relationship between the number of color centers generated by an electron and the kinetic energy of the incident electron, the efficiency of the data storage device is dependent upon the temperature of the environment and the effect of impurities in the alkali halide crystal layer. For most efficient operation, it is desired to have the crystal at room temperature.

In order that the solid state situation display apparatus provide a useful function, it is necessary that means be provided for selectively erasing the stored data. This "erasure" or "bleaching function" may be accomplished by the application of heat, by light absorbed by one of the bands, particularly of the F-band, or by both agencies in combination with relatively weak irradiation with ionizing radiations.

The display trace is developed in the alkali halide crystal by the action of the incident photoelectrons in the following manner. When particles of sufficient intensity penetrate the alkali halide crystal, the electrons in the crystal are dislocated and the so-called F-centers are formed. The F-centers in turn absorb light and in that manner develop a display trace. Unlike conventional cathode ray tubes, the display observed is not luminous, rather it has the appearance of darkened trace, that is a black on white background. In the preferred embodiment, the alkali halide crystal is KCl and provides a magneta trace which is purplish.

In order to effect erasure of the previously displayed data, a thin wire heater coil 32, widely spaced to minimize interference with the writing beam on the alkali halide layer crystal, is positioned adjacent this crystal, but spaced therefrom. Application of a bias voltage will induce heating of the wire heater coil which in turn will provide sufficient energy to free the trapped electrons in the color centers. Freeing of the trapped electrons destroys the F-centers and thus erase the display.

The operation of the apparatus of the present invention may be best seen by reference to FIGURE 2 which shows schematically the manner of achieving a visible trace. Assuming that a bias voltage is applied to one of the X coordinate control grids such as 16c, and a ground connection is made to the corresponding Y control grid 18e, this action will cause a small bit 20 of electroluminescent material to emit light photons 21 of energy. The photons 21 will impinge on the photosensitive material 26 as indicated by arrow 23 after passing through the transparent conducting coating 24 of cathode 22, and will eject photoelectrons indicated by the electron beam 25. The emitted electrons will be attracted by the positive voltage applied to the anode 28 and will enter the region occupied by the alkali halide crystal layer 30 where they will be captured. When the potassium chloride salt captures the electrons it turns color (from grayish-white to purple). The purple trace 31 which is also seen through the transparent electrode 28 will remain stored on the situation display section 14. While a high voltage potential is initially required between cathode 22 and anode 28, as supplied by a source 40 upon closure of switch 38 through leads 42 and 44, once the trace is developed there is no requirement of a holding potential to permit storage of the trace. The trace will remain with the power to the system removed. Storage times may be adjusted for periods of time ranging from minutes to years by varying writing time, alkali doping, anode voltage, etc. In the schematic diagram, the elements 24, 26, 30 and 28 are shown as being positioned within a rectangular casing 46. The elements operate within a vacuum and are thus shown schematically as being fully encased. In order to effect erasure of the permanently stored trace 31 within the potassium chloride layer 30, an electrical heating element indicated by numeral 32 is shown schematically positioned in the vicinity of this layer. A suitable power source 34 and a switch 36 are included in the circuit to allow selective erasure as desired.

In physical construction of a preferred embodiment shown in FIGURE 1, a pair of square glass slides 22 and 28 which, for example, may be four inches square and approximately one-quarter of an inch thick are provided with a raised edge, one-eighth of an inch thick and one-half inch wide. The recessed portions are coated with a transparent conductive coating to form respectively, a transparent cathode 24 and a transparent anode 29. The leads 42 and 44 are brought out of the recess by metallic conductors embedded in the glass. The cathode 24 has a photoemissive surface coating 26 vacuum deposited thereon and the anode 29 has deposited on it an appropriate alkali halide crystal layer 30 such as potassium chloride.

With the respective vacuum deposition being completed, the two portions of the "sandwich" are joined together by electron beam welding to form a vacuum assembly.

The heating coil 32 for the erasure of the display may be attached to the raised edge of the display element 14 adjacent the alkali halide crystal layer 30. The assembly of the two glass slides 12 and 14 takes place within a vacuum bell jar or other means facilitating the operation under vacuum conditions. As a result, this portion of the solid state situation display will be a complete integrated unit. The electroluminescent panel 10 associated with the display may be rigidly coupled to the sandwich or may be positioned at some distance, the only requirement being that the light beam emitted by any one of the electroluminescent light spots 20 must reach the cathode 24 without excessive spreading to insure resultant spot photoemission from layer 26.

In order to provide a system capable of use in tactical operations, certain parameters of the apparatus are inherently critical. Specific areas of interest include the interrelation of writing element intensity, scale size of the situation display and the required integration time, development of the requirement for the writing beam with respect to anode potential and the interrelation of the writing beam intensity, its hardness and erasure power. A representative system requirement is the tactical display of ship positions in a convoy or task force moving at the speed of fifteen knots and displayed on a screen 30 inches square with a scale size of one knot mile per inch. The plotter beam 4 will move at a scale of one-fourth of an inch per minute or one-sixteenth of an inch per fifteen seconds. Electroluminescent panels are available with inherent resolution of fifty lines per inch, the light output of the device is controlled by the impression of the X and Y voltage on appropriate grid leads. Values of 22 foot lamberts are obtainable with existing units. If panel resolution is decreased to 16 spots per inch, the light output increases approximately three times. With the least contrast that the eye can recognize being about two to three percent, tactical employment of a solid state situation display will require a readily observable trace in daylight conditions. It is necessary to assume the requirement of a contrast of twenty percent. To obtain a contrast of this magnitude, an induced charge density of approximately one microcoulomb per square centimeter is required. This value can be used to determine the required writing speed of the plotter or to put it in another way, the required integration time for each elemental area of the display. For multiple trace operations, the servo systems driving the respective X and Y inputs of the electroluminescent panel will change from one input to an adjacent input at a maximum rate equal to fifteen seconds. For tactical reasons, the solid state situation display should have the ability to display alphanumeric data on the plotter in addition to ground track or target position data. Assuming that the situation plotter is required to identify the trace at every interval, the total number of channels available for total data display can be obtained as follows:

$$m = \frac{T_d}{T_I + T_{GG} + T_S}$$

where $T_d$ is the time duration between movement from one geographic point to another. In the system of this invention, the equivalent time is determined by display scale size. $T_I$ is the required integration time of the plotter, $T_{GG}$ is the maximum time required to generate any particular character and $T_S$ is the required switching time between respective channels. Substitution of typical values gives:

$$m = \frac{15{,}000 \text{ ms.}}{(22 + 66 + 12) \text{ ms.}} = 150 \text{ channels}$$

Thus, the plotter may be expected to display 150 tracks and associated alphanumeric data. Where the display is used in a tactical operation involving elements which are operating at a much higher speed such as aircraft rather than ships, the number of channels must be reduced by a factor equal to the speed ratio change. For instance, assuming an aircraft is traveling approximately ten times as fast as a surface ship, the solid state situation display apparatus could display approximately fifteen aircraft simultaneously.

A change in light intensity has a linear effect on the generation of color centers since the number of electrons ejected is directly proportional to the intensity of the light source. Thus, if the area of the unit electroluminescence display cell is changed to 1/2500 of a square inch, then light output will be reduced to a factor of approximately 3 and the required integration time is increased by a similar value. The solution to this problem may reside in the increase of light output of any of the electroluminescent panels with respect to the applied voltage. However, in achieving higher light outputs, a shorter operating life of the electroluminescent panel results. As an indication, panels having a light output of 10 to 20-foot lamberts have an estimated useful life of 2000 hours. Where the light output has been increased to a value on the order of 1700 lamberts, the operating time is reduced to somewhere between fifty and seventy-five hours.

In order to show the applicability of the compact, solid state situation display apparatus of the present invention to a representative military application involving high speed aircraft, the following situation will be assumed. It is desirable to display the relative position of three anti-submarine aircraft to their respective pilots. Assuming that it is desirable to display aircraft position on a 2000 yard per square inch scale within a ten nautical mile area, the initial configuration of the solid state situation display apparatus can be stated in the following summary table:

Number of traces____ 3 (own aircraft and two adjacent aircraft).
Display scale_____ 2000 yards per inch.
Display size_____ 10 inches square (this corresponds to the required ten nautical mile area).
Display scale size____ 1/32 of an inch (this is a compromise between accuracy of display and ease of operator viewing).
Display speed response_____ 80 yards per second.
(ASW aircraft speed)_____ 780 milliseconds per writing element.
Additional capacity__ Alphanumeric identification of respective aircraft is required.

Since an electroluminescent writing element of known construction 1/16 of an inch square requires an integration panel of approximately 22 milliseconds and since in this application there is a requirement for a writing element of one-half the size and hence one-fourth of the area, the integration time will be approximately 90 milliseconds. Because of the need for alphanumeric capability, an additional time of approximately 90 milliseconds is required. The total writing time for each aircraft then will be on the order of 180 milliseconds. The display must be capable of switching and writing at faster rates than the input navigation data changes.

Therefore, for successful operation;

$$nT \leq T_S$$

where $n$ is the number of traces required,
$T$ is the required integration time and
$T_S$ is system switching time.

In the particular example, $n=3$, $T$ is equal to 180 milliseconds, and $T_S$ is equal to 780 milliseconds. It is apparent that the inequality holds since three times 180 is equal to 540 and much less than the 780 milliseconds required to adequately satisfy the tactical requirement.

In order to provide multiple traces which may be simultaneously viewed, it is necessary to make use of time sharing of the single set of X and Y coordinate inputs for the electroluminescent panel 10. A typical means for providing the time sharing function is shown by the schematic circuit of FIGURE 3.

In the circuit shown, the particular X and Y coordinates are selectively energized momentarily through the use of an analog servo system. When the device is in operation to provide simultaneous multiple traces, an angular change is transmitted from a navigation computer (not shown) to the system tracking device. The servo system continuously changes the selection of X and Y coordinates to provide the appropriate sets of coordinates corresponding to the instantaneous position of the system to be tracked. In the system shown, three traces are desired on the display panel 14, track 1 is shown as a solid line, track 2 of the system is shown as a series of relatively long dashes and track 3 is shown as a series of relatively short dashes. Since each respective pair of coordinates for all three tracks must be tracked simultaneously, a means for sampling each coordinate must be provided. The sampling is accomplished by the timing circuit in the circuit shown. A gate selection circuit 60 determines which one of the input lines 70, 72 or 74 is to be energized by the bias power supply 62 through its connection 64 to the gate selection circuit 60. Timing reference 66 delivers the switching pulse 68 to the gate selecting circuit for sequentially selecting, in any desired sequence, lines 70, 72 and 74. The position of movable contacts 76, 78 and 80 associated respectively with input lines 74, 72 and 70 is determined by the input signals from each of the analog servo systems associated with its movable contact. Each of the servo systems include appropriate servo motors 82, 84, and 86 for systems 3, 2 and 1, respectively, for controlling the horizontal position of the associated movable contact members 76, 78 and 80. It is apparent that the particular X coordinate for any one of the three traces will be selectively energized by the combination of the gate selection circuit 60 and the servo system associated with said one of the traces. In the operation of this circuit, a timing reference 66 sequentially provides the appropriate power to excite both the X and Y coordinates of the electroluminescent panel. This allows conversion of navigation servo position into a track position on the solid state display, with the track position closely following the navigation servo position. While there have been shown and described the basic components of the system as applied to the X coordinates, a similar operation occurs for selecting the individual Y coordinates on a time sharing basis to create the varied tracks indicative of situation change.

From the above it is apparent that the present system advantageously allows both display and retention of an optical image of more than one geometric point of interest at any time including alphanumeric data. Since the display is in permanent form, it may be removed and stored physically without requiring an active power source to retain the image. Since the situation display is entirely of the solid state type, it is completely static and able to withstand the severe environmental conditions encountered in tactical military operations.

While there have been shown, described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A solid state situation display apparatus comprising; a selectively operable electroluminescent element for creating a momentary optical image, a photoemissive element positioned to receive said optical image for transforming said optical image into electron form and an electron responsive chemical display element positioned to receive said electron image for converting said electron image into a visible form and retaining the visible image for a substantial period of time after removal of said momentary optical image from said electroluminescent element.

2. A situation display apparatus comprising; means for momentarily creating an optical image in the form of a pattern of segregated light beams, means positioned in the path of said light beams for converting said light beams into corresponding beams of electrons, and display means positioned in the path of said electron beams for transforming said electron image into a visible image capable of retention for a substantial time after said momentary optical image is removed.

3. A solid state situation display apparatus comprising an electroluminescent panel including a plurality of X and Y coordinates, means for momentarily energizing selected pairs of said coordinates electrically to effect an optical image, a photoemissive panel positioned in the path of said optical image for transforming said optical image into electron form, an electron responsive chemical display panel positioned in the path of said moving electrons for converting said electron image into a visible image, said chemical display panel being capable of retaining said visible image for a substantial period of time after removal of said momentary optical image from said electroluminescent panel.

4. Apparatus as claimed in claim 3 wherein said chemical display panel includes an alkali halide crystal layer and means for creating a potential difference between said alkali halide crystal layer of said chemical display panel and said photoemissive panel to effect movement of electrons from said photoemissive panel to said chemical display panel.

5. Apparatus as claimed in claim 4 further including means for removing the potential between said photoemissive panel and said chemical display panel after creation of said visible image with said alkali halide crystal layer retaining said visible image after said potential is removed.

6. Apparatus as claimed in claim 4 further including means for selectively erasing said visible image from said alkali halide crystal layer.

7. Apparatus as claimed in claim 6 wherein said erasure means comprises means for heating said alkali halide crystal layer.

8. Apparatus as claimed in claim 7 wherein said heating means comprises an electrical heating coil positioned adjacent said halide crystal layer.

9. A solid state situation display apparatus for use with an electroluminescent panel including selectively operable means for momentarily creating an optical image on one face thereof, comprising; spaced transparent electrode means, one of said electrodes including a coating of photoemissive material on one face thereof, said other electrode including an alkali halide crystal layer on the surface of said electrode facing said photoemissive material coating of said first electrode, means for providing a potential difference between said electrodes whereby said photoemissive coating acts to transform said optical image of said electroluminescent panel into an electron beam image and said alkali halide crystal layer acts to convert said electron beam image into a visible image and to retain said visible image for a substantial period of time after removal of said momentary optical image from said electroluminescent panel and after removal of said potential difference.

10. Apparatus as claimed in claim 9 in which a vacuum is maintained between said spaced transparent electrodes.

11. Apparatus as claimed in claim 10 wherein heating means are provided adjacent the alkali halide crystal layer and further means are provided for selectively energizing said heating means to erase said visible image from said alkali halide crystal layer.

12. Apparatus as claimed in claim 9 further including means allowing unitary removal of said spaced electrodes from said electroluminescent panel whereby said visible image on said alkali halide crystal layer electrode may be physically stored for a substantial period of time remote from said solid state electroluminescent image creation panel.

13. A solid state situation display apparatus comprising; a selectively operable electroluminescent element for creating momentary optical images including a matrix having a plurality of sets of intersecting conducting elements, a photoemissive element positioned to receive said optical images for transforming said optical images into electron form and an electron responsive chemical display element positioned to receive said electron images for converting said electron images into visible form and retaining said visible images for a substantial period of time after removal of said momentary optical images from said electroluminescent element, a plurality of systems to be tracked, a servo motor for each of said systems, switching means associated with each of said servo motors for selecting one of said conducting elements of a given set to be energized, a common power supply for energizing said selected conducting element, and time sharing means for sequentially energizing each of said switching means momentarily to provide multiple system traces for simultaneous viewing.

14. A solid state situation display apparatus comprising; a selectively operable electroluminescent element for creating momentary optical images including a matrix having a pluraliy of sets of intersecting conducting elements, a photoemissive element positioned to receive said optical images for transformation into electron form, an electron responsive chemical display element positioned to receive said electron images for conversion into a visible form and for retaining said visible images for a substantial period of time after removal of said momentary optical images from said electroluminescent element, a plurality of systems to be tracked, a servo motor for each of said systems, switching means associated with each of said servo motors and common to one of said sets of intersecting conducting elements, said servo motors acting to individually select one of said conducting elements of said given set to be energized, a common power supply, and time sharing means for sequentially connecting said common power supply to each of said switching means to effect multiple systems traces for simultaneous viewing.

References Cited in the file of this patent
UNITED STATES PATENTS

| | | |
|---|---|---|
| 1,069,842 | Anschutz-Kaempfe | Aug. 12, 1913 |
| 2,856,553 | Henisch | Oct. 14, 1958 |
| 2,902,670 | Cutler | Sept. 1, 1959 |
| 3,015,747 | Rosenberg | Jan. 2, 1962 |